A. B. ROBERTSON.
MILKING MACHINE PULSATOR.
APPLICATION FILED DEC. 15, 1919.
1,361,617.
Patented Dec. 7, 1920.
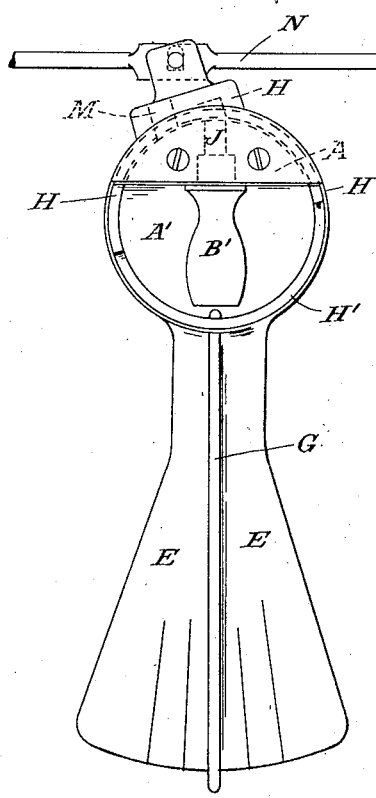
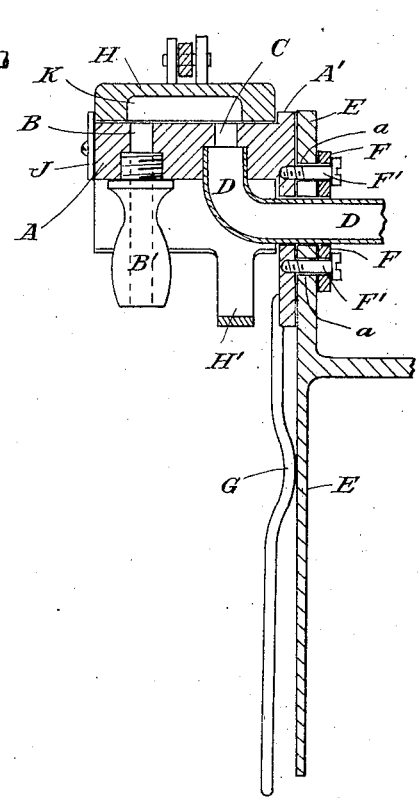
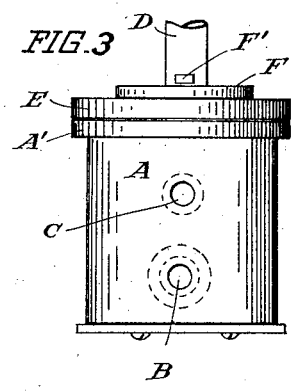
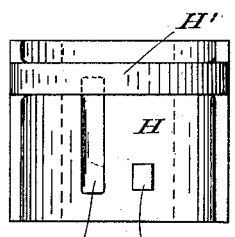
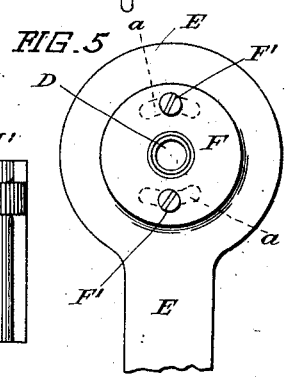
Inventor
Archibald B. Robertson,
By B. Singer, Atty.

UNITED STATES PATENT OFFICE.

ARCHIBALD BURRELL ROBERTSON, OF AUCKLAND, NEW ZEALAND, ASSIGNOR TO THE AUTO MILKING MACHINE COMPANY LIMITED, OF HAWERA, NEW ZEALAND.

MILKING-MACHINE PULSATOR.

1,361,617.   Specification of Letters Patent.   Patented Dec. 7, 1920.

Application filed December 15, 1919. Serial No. 345,110.

*To all whom it may concern:*

Be it known that I, ARCHIBALD BURRELL ROBERTSON, subject of the King of Great Britain, residing at Auckland, in the Dominion of New Zealand, have invented a new and useful Improvement in Milking-Machine Pulsators; and I do hereby declare the following to be a full, clear, and exact description of the same.

This invention relates to those well known classes of milking machine pulsators in which a slide plate or block is provided and a sliding valve plate fits thereon and reciprocates upon its surface. These are made in various general form, such as a flat surface with straight reciprocations, arced surfaces with partial rotary reciprocations, or flat surfaces with partial rotary reciprocations. The slide block or plate is formed with two ports therein opening into its face, one of which is adapted to be connected to the teat cups by the usual flexible connection while the other is connected with the vacuum main of the plant. The sliding valve plate is so constructed that in its reciprocations it will at one end of its movements connect the teat cup port with the vacuum port of the slide block so that the air will be exhausted from the teat cups, and at the other end of its movement, will open the teat cup port to the atmosphere and thereby admit air to the teat cups. This principle of operation is well known and provides the pulsations of the teat cups by which the action of the milking vacuum is alternately stopped and re-started.

Hitherto no provision has been made in these pulsators for the regulation and variation of the relative periods in the movements of the sliding valve plate at which it will connect the teat cups with air and with vacuum. Consequently, the periods during which these connections occur in the pulsations are constant. It is a well known fact that cows vary very much in their responsiveness to the action of the milking machine and to get the best results from the cows, as well as to keep the cows in best condition, it is advisable that the pulsation periods should be varied to suit a cow's nature. For instance a cow may be a hard milker requiring a proportionately long cessation of the milking vacuum action and a short submission to such vacuum, while other cows may be easy milkers requiring a reversal of these conditions, while still others may be normal in which the relative pulsation actions may be equaled.

Consequently, the provision of means to allow of these conditions being quickly varied for each cow, is desirable and the present invention has been devised in order to provide improvements in the pulsator construction through which these variations may be made.

The invention therefore consists in so constructing the slide block of the machine, that the ports thereof may be shifted in either direction from a central normal position in the line of the sliding valve plate's movement. Consequently these ports may be shifted so that the ports on the sliding valve plate may connect them or open the teat cup port to atmosphere at different relative points in the plate's travel to and fro and thereby attain the desired effects. A movement of the slide block ports in one direction will result in the vacuum connection being lengthened and the air connection correspondingly shortened, while a movement in the other direction will reverse such conditions.

The invention may be carried out in any convenient manner such as will fit in with the general construction of the pulsator concerned. In all cases however, provision is made for holding the movable part of the slide block at any point at which it may be positioned. The movable part may consist in the whole slide block or in a plate fitting on to it and having the ports formed in it. A handle may be provided for shifting the ports, such handle passing over an indicator plate or dial to guide an operator in the regulation of the pulsator.

The accompanying drawings show the application of the invention to a pulsator of the partial rotatory type in which the slide valve rocks to and fro over an arced surface. This form of the invention is shown as an approved form for carrying out the principle of construction and operation involved and not with the intention of confining the invention to the construction illustrated.

In the drawings:—

Figure 1 is a front elevation, and

Fig. 2 a sectional side elevation of the complete pulsator.

Fig. 3 is a plan view of the arced slide block.

Fig. 4 is an underneath plan of the slide valve plate for fitting on the said slide block.

Fig. 5 is a back elevation of the upper portion of the pulsator.

The slide block A is made with its upper surface shaped transversely of arc form and it is attached to or made in one with a circular plate A' so as to extend horizontally outward from the top portion of such plate. This block is formed with the two ports B and C passing vertically through it in a line one behind the other along the crown of the block. One of these ports B at its under end has the nipple fitting B' attached thereto and forms the pulsator port of the appliance. The other port C is continued into the tube D, that is bent to extend horizontally out through the center of the plate A' and is then connected by a suitable flexible connection with the vacuum main.

The block thus constructed is fastened to the front of a frame plate E through which the tube D passes loosely, by means of the washer F, loosely mounted on the tube D against the back of such plate, and screw pins F' passing through such washer and plate into the circular plate A' of the slide block. These screw pins pass loosely through curved slots a in the plate E and formed concentrically with the tube D, as shown by the dotted lines in Fig. 5. The frame plate E is fastened to any suitable fixture so that it holds the slide block firmly thereon.

The tube D then forms an axis upon which the slide block may rotate freely. It is however, held from rotation and retained in any desired position by means of a handle rod G fixed to the plate A' and extending radially down in front of a lower extension of the frame plate E. This bar is bent so as to make a springy frictional engagement with the plate and, while affording means for turning and adjusting the block A, to hold it firmly in the adjusted position while the slide valve is reciprocating thereon in the working of the pulsator.

H is the slide valve. This is formed as a semi-circular plate that fits over the slide block so as to make a close surface contact with its upper surface. It is then retained thereon by the plate J fastened to the front end of the block A and projecting at its edge beyond the edge of the block, and by means of a ring H' near its edge completing the circle with the slide valve itself. This slide valve is made in the usual way so that when reciprocated on the slide block, it will at one end of its movement, position a groove K formed in its underside so that the two ports B and C will be connected, and when at the other end will cause an air port M formed therein, to coincide with the port B, while keeping the port C closed and thus obtain the desired pulsations through the connection B'. It is rocked on the slide block reciprocally by any of the well known mechanical means already employed for operating pulsators of this type, as for instance by the connecting rod N pivotally connected to it.

It will be apparent that when the slide block A is positioned so that the ports B and C extend in a line coincident with the center of movement of the slide valve the rate of changes between the air and vacuum connections with the port B will be regular, but when the slide block is moved to one or other side of such central line the connections of such port with air and vacuum will be retarded or advanced in their relative periods. Thus the slide block may be adjusted to cause the change from air to vacuum, to be made at a greater rate than from vacuum to air, and likewise to reversely vary such changes. Consequently, this moving slide block will provide quick means for adjusting the pulsations to suit different cows and by arranging a number of indicator lines to radiate on the frame plate E, as shown in Fig. 1, the correct positioning of the slide block to suit any particular cow's peculiarities may be readily carried out.

It will also be readily understood that this principle of adjusting the position of the ports in the slide block, in relation to the limits of reciprocatory movements of the slide valve, may be quite easily applied to pulsators of any of the usual types.

I claim:—

1. A milking machine pulsator comprising supporting means, a block mounted thereon for pivotal movement and having a vacuum main coincident with its pivotal axis, a port extending from said main to a surface of said block and also having a pulsator port extending to said surface and provided with a nipple for attachment of a flexible connection, means to secure said block in adjusted position, a slide valve arranged for reciprocating movement on said surface of the block and having a channel to establish communication between said ports when said valve is in one position and an air port to register with said pulsator port when said valve is in another position, and means to operate said valves.

2. A milking machine pulsator comprising a frame plate, a block pivotally mounted on said plate and having a vacuum main coincident with its pivotal axis and extending through an opening in said plate, said block also having a port extending to one of its surfaces from said main and a pulsator port extending from said surface and provided with a nipple for attachment of a flexible connection, a handle rod attached to said block and coacting with said frame plate to secure said block in adjusted position, a slide valve arranged for reciprocating movement on said surface of the block and having a channel to establish communication between said ports when said valve is in one position and an air port to register with said pulsator port when the valve is in another position, and means to operate said valve.

In testimony whereof, I have signed this specification in the presence of two subscribing witnesses.

ARCHIBALD BURRELL ROBERTSON.

Witnesses:
WILLIAM EDWARD GRANT,
HELEN CAMPBELL.